Figure 1:
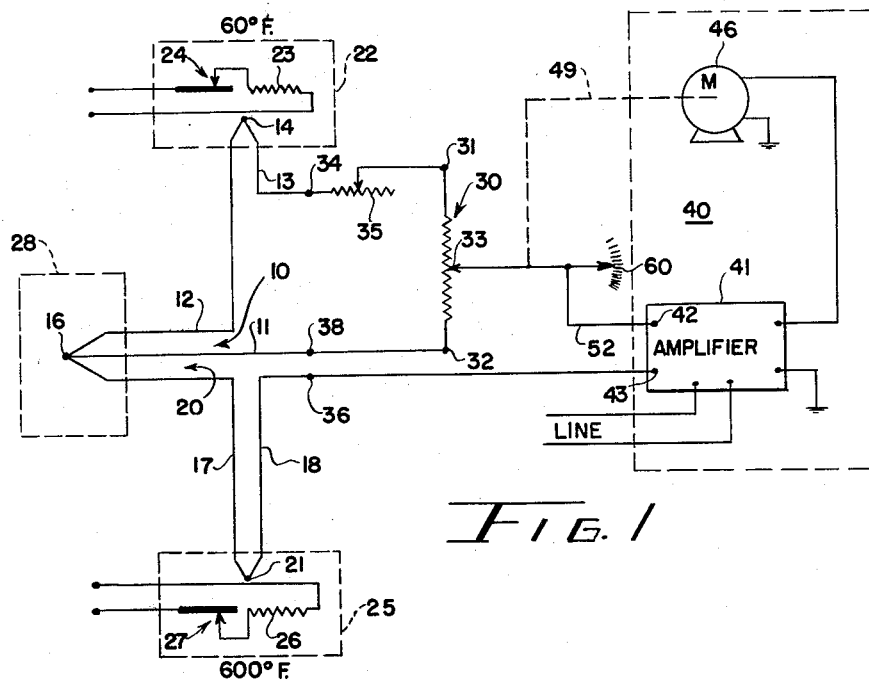

Dec. 7, 1954  E. E. JONES  2,696,119
TEMPERATURE INDICATING APPARATUS
Filed Dec. 12, 1951

*INVENTOR.*
ENNIS E. JONES
BY George H Fisher
*ATTORNEY*

2,696,119

TEMPERATURE INDICATING APPARATUS

Ennis E. Jones, St. Louis Park, Minn., assignor to Minneapolis-Honeywell Regulator Company, Minneapolis, Minn., a corporation of Delaware Application December 12, 1951, Serial No. 261,297

7 Claims. (Cl. 73—360)

The present invention is concerned with a new and an improved thermoelectric temperature indicating or measuring circuit which is particularly adapted for use without a standardization voltage source.

The conventional thermocouple temperature measuring potentiometer circuit comprises a slide wire rheostat, a galvanometer, a service cell which furnishes the potential that is necessary to operate the potentiometer circuit, a thermocouple, a standard cell, a selector switch, and a calibrating variable resistance. Since the accuracy of such a thermocouple temperature measuring potentiometer circuit depends primarily on the constancy of the output voltage of the service cell or any voltage supply that might be used in the particular case, the voltage sources that are made available by the use of rectifiers connected to an alternating current generating supply are not stable enough for use in such a circuit. Therefore, if a service cell, or dry cell in a particular case, is used, it is necessary that a standardization voltage supply be available to standardize the potentiometer network at frequent intervals during its use. The standard voltage cell which is available on the commercial market must be constructed to withstand various conditions that such a thermocouple temperature measuring potentiometer circuit might have to withstand. However, when this type of measuring circuit is applied to airborne equipment, the existence of changing ambient temperatures and the variations in altitude have presented problems which have made the construction of such a standard cell almost impractical and very expensive.

In a copending patent application, Serial No. 198,263, filed November 30, 1950 by Eduard C. Petry, an improved temperature measuring thermocouple potentiometer circuit has been disclosed in which a standardization voltage is not required. The measuring circuit of the copending application comprises two thermocouples having dissimilar voltage output characteristics whose output voltages are connected to a common potentiometer circuit in opposition so that the ratio of the voltage output of the two thermocouples provides an indication of the temperature of the hot junction of each of the thermocouples. One of the temperature limits of the temperature range of this measuring circuit is the temperature at which the voltage output characteristic curves of the two thermocouples intersect.

In a second copending patent application, Serial No. 203,973, filed January 2, 1951 by Orville J. Underwood, an improved temperature measuring thermocouple potentiometer circuit has been disclosed in which a standardization voltage is not needed and the temperature range is not limited at the temperature at which the voltage output characteristic curves of the two dissimilar thermocouples intersect. However, in the selection of dissimilar thermocouples, should the thermocouples selected have output voltages whose ratio approaches zero and becomes negative, such selected temperature measuring thermocouples would have a temperature limit existing at that temperature when the voltage ratio is zero.

In the above mentioned copending applications it is necessary, first that at least one of the two thermocouples be nonlinear, and second, that the two thermocouples be dissimilar. This necessitated the selection of at least three thermocouple elements which would meet three requirements of suitable electromotive force output, nonlinearity, and the ability to withstand the temperatures to be measured.

In the present invention an improved thermocouple temperature measuring apparatus has been devised which has a greatly extended range and which allows a great variety of thermocouple elements to be used since it is not necessary that the thermoelectrical characteristics of the thermocouple be of any particular type and only two materials need be selected since similar thermocouples are to be used. It can be immediately recognizd that without the requirement of nonlinearity and with only two thermocouple elements to select, it is much easier to obtain elements which give suitable electromotive force output and are capable of withstanding the temperatures of the range to be measured.

It is an object of the present invention to provide a new and an improved temperature indicating apparatus in which the output voltages of two similar thermocouples are applied to a potentiometer circuit such that the ratio of their output voltages is indicative of the temperature of their temperature sensing junctions.

It is a further object of the present invention to provide a temperature indicating apparatus in which two similar thermocouples having reference junctions maintained at constant but different temperatures are connected to a potentiometer circuit to indicate the temperature of the common location of their temperature sensing junctions, with the temperature range of the apparatus being governed at one of its ends by the nearest reference junction temperature.

Still another object of the present invention is to provide a temperature measuring apparatus in which two similar thermoelectric means are connected one across the terminals of a potentiometer and the other across one terminal and through an impedance means to the tap of the potentiometer such that the ratio of the output voltages, and thereby the temperature of a heated area, is indicated by the position of the potentiometer tap when the tap is adjusted to produce a null in the voltage across the impedance means.

These and other objects of the invention will become apparent after reading the attached specification in connection with the associated drawings wherein;

For purposes of convenience a preferred embodiment of this invention is described wherein the hot thermocouple junction is the temperature sensing junction and the cold thermocouple junction is the reference junction. It is to be noted however, that the invention can be used to indicate temperature where the temperature sensing junction is at a lower relative temperature than the reference junction.

Figure 2:
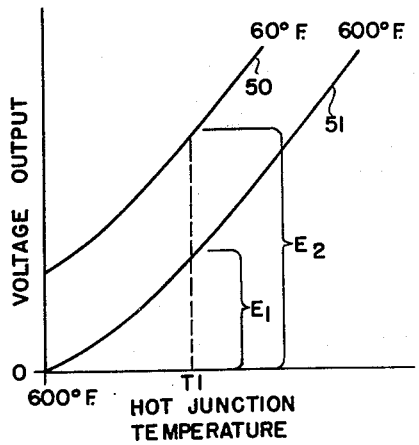
Figure 3:
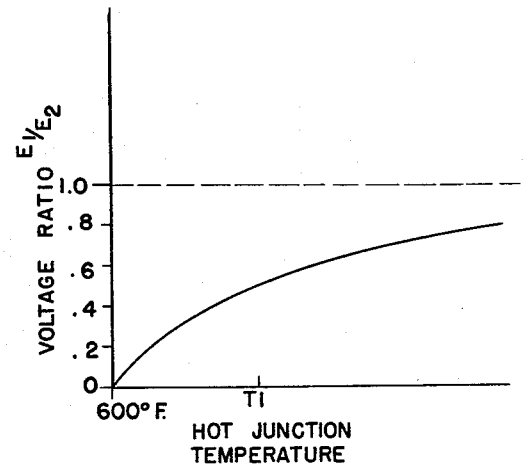

Figure 1 is a circuit diagram of one embodiment of the invention;

Figure 2 is a graphical representation of the thermoelectric characteristics of a theoretical pair of similar thermoelectric means with their cold junctions maintained at constant but different temperatures, showing a plot of output voltage versus temperature of the hot junction; and Figure 3 is a graphical representation of the ratio of the output voltages as a function of the common temperature of the hot junctions of the thermoelectric means of Figure 2.

With reference to Figure 1, a thermoelectric thermometry potentiometer circuit is shown comprising a first thermoelectrical means in the form of a thermocouple 10 comprising two dissimilar metallic elements 11 and 12 and a metallic element 13 which is of the same material as the element 11. The metallic elements 12 and 13 are joined to form a cold junction 14 and the metallic elements 11 and 12 are joined to form a hot junction 16. A second thermoelectric means in the form of a thermocouple 20 is shown having a metallic element 17, a metallic element 18 and the before mentioned metallic element 11. The metallic element 18 is identical to the before mentioned elements 11 and 13 and the elements 12 and 17 are identical. The elements 17 and 18 are joined to form a cold junction 21 and the elements 11 and 17 are joined to form a second hot junction in common with the before mentioned hot junction 16.

It is immediately recognized that in some instances it may be desirable to provide an element 11 for each of the thermoelectric means 10 and 20 instead of the common element 11 shown in Figure 1.

The cold junctions of the thermoelectric means 10 and 20 are located in hot constant temperature zones shown in the form of electric ovens 22 and 25. The cold junction 14 is located in the oven 22, which oven is maintained at a constant temperature by means comprising a heater 23 which is connected to a source of power, not shown, through a bimetal switching means 24. The cold junction 21 is located in the oven 25 which oven is maintained at a constant temperature by means comprising a heater 26 connected to a source of power, not shown, through a bimetal switching means 27.

It will be immediately recognized that the temperatures of the ovens 22 and 25 can be maintained at any desired temperature simply by changing the bimetal switching means 24 or 27 respectively. For convenience the bimetal switching means 24 has been selected such that the oven 22 will be maintained at 60 degrees Fahrenheit while the bimetal switching means 27 has been selected such that the oven 25 will be maintained at 600 degrees Fahrenheit. It is not intended that these selected temperatures will in any way limit the invention as they are merely used in a particular application and obviously may differ for purposes of explanation and other applications.

The common hot junction 16 of the thermoelectric means 10 and 20 is located in a confined space the temperature of which it is desired to measure. This space may take a great variety of forms, but, for convenience, it has been shown as an oven 28.

A potentiometer 30 having terminals 31 and 32 and having an adjustable tap 33 is shown connected to the thermocouple circuit at a terminal 38 and at a terminal 34 through a calibrating potentiometer 35.

A rebalance means 40 is shown in the form of an amplifier 41 and a follow-up motor 46. This amplifier 41 may take the form of any conventional amplifier which is sensitive to both the polarity and the magnitude of the input signal to its input terminals 42 and 43. The motor 42 is connected by a linkage 49 to position the tap 33 of the potentiometer 30 in accordance with the input signal to the amplifier 41.

Referring to Figure 2, the thermoelectrical characteristics of two theoretical thermocouples are shown with the output voltages of the thermocouples plotted as functions of the temperature of the hot junction. Since the invention contemplates the use of two similar thermocouples with their cold junctions maintained at constant but different temperatures, it can be seen that the thermoelectrical characteristics of the two thermocouples will be identical. However, the characteristic curves of these two thermocouples will be displaced along the voltage axis since the output voltage of a thermocouple depends upon the temperature differential of the hot and cold junctions. A curve 50 represents the thermoelectrical characteristics of a theoretical thermocouple, such as 10 of Figure 1, wherein the cold junction is maintained at a temperature of 60 degrees Fahrenheit. A curve 51 represents the thermoelectrical characteristics of a similar theoretical thermocouple, such as 20 of Figure 1, wherein the cold junction is maintained at 600 degrees Fahrenheit. At any particular hot junction temperature the voltage produced by the thermocouple having the characteristic curve 51 is represented by $E_1$ and the output voltage of the thermocouple represented by the characteristic curve 50 is indicated as $E_2$. It can be seen that the output voltage of thermocouple 20, represented by curve 51, is zero when the hot junction temperature is 600 degrees Fahrenheit. At 600 degrees Fahrenheit the output of thermocouple 10, represented by curve 50 has a definite value representative of a 540 degree Fahrenheit difference in the hot and cold junction temperature of thermocouple 10.

Figure 3 is a graphical representation of the voltage ratio of $E_1$ to $E_2$ as plotted versus the hot junction temperature. It can be seen that this voltage ratio is zero at the low end of the temperature range and increases asymptotically to a voltage ratio of one as the temperature of the hot junction increases. The intersection of the curve with the origin of the ratio and temperature axis is at a point where the ratio equals zero and the temperature of the hot junction equals 600 degrees Fahrenheit, the highest cold junction temperature.

Operation

As a basis for discussion of the operation of the present invention it is desirable to discuss briefly the conventional thermoelectric temperature measuring circuit. It is a basic definition that, in a thermoelectric circuit which is composed of a closed loop of two elements A and B with the current flowing from the A element to the B element at the cold junction of the thermocouple, the element A is defined as being thermoelectrically positive with respect to the element B.

In such a closed thermocouple loop of two elements A and B having a hot and a cold junction, it is possible to break either of the elements A or B, at any desired point between the hot and cold junctions and connect the broken ends of each of the two portions of the broken element to one each of two conductors of a potentiometer circuit. Assume that the B element of a closed thermocouple loop of the elements A and B is broken between the two junctions and connected to two copper conductors, the thermocouple circuit would have a hot junction of A and B elements, a cold junction of the A and B elements and a pair of junctions of the B element and the copper conductors. In this circuit the cold junction temperature must be maintained constant, assuming that there is no compensative means employed. The junctions between the B element and the copper conductors must be maintained at a common temperature if a potentiometer connected to the conductors is to accurately indicate the hot junction temperature. However, it is not necessary that the common temperature of the junctions between the B element and the copper conductor remain constant. If the two junctions between the B element and the copper conductors are not maintained at the same temperature the resultant electromotive force in the circuit will depend not only upon thermocouple element materials A and B and the temperature of the measuring junction but also upon the temperatures of these added junctions between the B element and the copper conductors.

Referring to Figure 1, it can be seen that in the thermocouple 10 the element 11 has been connected to the potentiometer 30 and the element 13, made of the same material as element 11, has been connected to the potentiometer. Therefore, this thermocouple 10 having the elements 11, 12 and 13 is similar to the above mentioned thermocouple having the elements A and B with the element B broken and attached to a potentiometer. Also, the thermocouple 20 is similar to the above mentioned thermocouple having the elements A and B since in this case the similar elements 11 and 18 have been connected to the terminals 38 and 36.

For purposes of explanation it will be assumed that in the thermocouple 10 the element 13 is thermoelectrically positive with respect to the element 12. It can therefore be seen that if the thermocouple 10 is considered as a source of voltage, the element 13 becomes the negative lead of this source of voltage while the element 11 becomes the positive lead of this source of voltage. It follows that since the thermocouple elements 12 and 17 are similar and the thermocouple elements 18, 11 and 13 are similar, the element 18 of thermocouple 20 is thermoelectrically positive with respect to the element 17. Therefore, considering the thermocouple 20 as a source of voltage, the conductor 18 becomes the negative lead of this source of voltage while the conductor 11 becomes the positive lead of this source of voltage.

It will now be assumed that the temperature of the oven 28 wherein the thermocouple hot junctions 16 are located is at a temperature T1, which temperature is indicated on the temperature scale of the graph of Figure 2. For this condition, the thermocouple 20 supplies to the terminals 38 and 36 a potential of a magnitude $E_1$ and a polarity such that the terminal 38 is positive with respect to the terminal 36. Also, the thermocouple 10 supplies to the terminals 38 and 34 a voltage of the magnitude $E_2$ and a polarity such that the terminal 38 is positive with respect to the terminal 34. A portion of this last mentioned voltage appears across a portion of the potentiometer 30 between the tap 33 and the terminal 32.

It can be seen that when this voltage is considered in a direction from the tap 33 to the terminal 32, this is a voltage rise. The input signal to the input terminals 42 and 43 of the amplifier 41 can be found by tracing the circuit which includes the above mentioned portion of the potentiometer 30 and the thermocouple 20. This circuit can be traced from the upper input terminal 42 through conductor 52, potentiometer tap 33, the above mentioned portion of potentiometer 30, potentiometer terminal 32, terminal 38, thermocouple element 11, hot junction 16, thermocouple element 17, cold junction 21, thermocouple element 18, and terminal 36 to the lower input terminal 43. In this last named circuit there is a voltage rise from the tap 33 to the terminal 32 of the potentiometer 30 and there is a voltage drop from the terminal 38 to the terminal 36. Therefore, if the adjustment of the tap 33 is such that the voltage rise from tap 33 to terminal 32 is equal to the voltage drop produced by the thermocouple 20, the input to the amplifier will be zero and the amplifier will not be effective to control the motor 46 to cause readjustment of the tap 33. However, if the tap 33 is not at a position to produce a zero voltage input to the amplifier 41 two conditions may exist. The first of these conditions is that the tap 33 will be such that a signal voltage of a first polarity is applied to the terminals 42 and 43 and the second condition is such that a signal voltage of the reverse polarity will be applied to the terminals 42 and 43.

The amplifier 41 is constructed such that it is sensitive to both the magnitude and the polarity of the input signal to the input terminals 42 and 43 and therefore the direction of adjustment of the potentiometer tap 33 depends upon the polarity of the input signal to the amplifier 41 while the extent of the adjustment depends upon the magnitude of this signal. This adjustment will continue until the tap 33 is positioned at such a point that the voltage rise from the tap 33 to the terminal 32 of the potentiometer 30 counteracts the voltage drop from the terminal 38 to the terminal 36, which voltage drop is produced by the thermocouple 20.

Assuming now that the temperature of the oven 28 increases above the value T1, the voltage output of both the thermocouples 10 and 20 will increase. Reference to Figure 2 shows that the largest percentage increase will occur in thermocouple 20 represented by curve 51. This results in an increase in the ratio of E1 to E2 as shown by the graph of Figure 3. This also results in an adjustment of the tap 33 of potentiometer 30 in an upward direction thereby placing a greater portion of the potentiometer and a greater portion of the output voltage of thermocouple 10 to be effective upon the amplifier 41.

This last mentioned result can be explained with reference to Figure 1. As above stated, the percentage voltage increase is greater for thermocouple 20 than it is for thermocouple 10, therefore, the voltage applied to the input terminals 42 and 43 of the amplifier 41 is no longer zero. The polarity of this voltage is such that adjustment of the tap 33 by means of the rebalance means 40 is in a direction to reduce the voltage to zero. Therefore the tap 33 is adjusted, as above mentioned, in an upward direction and a scale 60, calibrated in degrees of temperature, indicates the temperature of the oven 28. This scale reading is also indicative of the ratio of the output voltage of thermocouple 20 to that of thermocouple 10.

Referring to Figure 3, the voltage ratio of the two thermocouples is plotted as a function of the hot junction temperature and it can be seen that this plot forms a section of a curve which approaches the ratio value of one as a limit. For example, if the curve of Figure 2 were straight lines the curve of Figure 3 would be a true hyperbola. The potentiometer 30 of Figure 1 has been indicated schematically as a linear potentiometer and therefore the scale 60 in the apparatus of Figure 1 is a non-linear scale taking into account the equation of the curve of Figure 3.

It can therefore be seen that the apparatus of Figure 1 has a low temperature limit which is governed only by the maximum temperature at which one of the cold junctions is maintained. With the values of 60 and 600 degrees Fahrenheit selected for the cold junctions 14 and 21, respectively, reference to Figure 2 will show that as the hot junction temperature reaches 600 degrees Fahrenheit the output of the thermocouple 20 is indicated by the curve 51 will approach zero voltage. Therefore, the lower limit of the apparatus has been reached. If it is necessary to measure a temperature lower than 600 degrees Fahrenheit, a different thermostatic switching means can be substituted for the means 27 such that the oven 25 will be maintained at a temperature lower than 600 degrees Fahrenheit. The measuring apparatus shown in Figure 1 theoretically has no upper limit and is limited only by such practical considerations as the sensitivity of the amplifier to be used with the apparatus, the flatness of the upper portion of the characteristic as shown in Figure 3, and the particular material selected to form the thermocouples 10 and 20.

The invention has been described where the temperature of the oven 28 is higher than the temperature of ovens 22 and 25. However, the oven 28 may be at a lower temperature than ovens 22 and 25, in which case changes such as recalibrating scale 60 must be made, these changes being obvious to those skilled in the art.

It can therefore be seen that I have shown an improved thermoelectric temperature measuring apparatus having a very great range and an apparatus wherein it is necessary to select only two thermocouple materials for a particular range of temperature to be measured. Having thus described my invention, I claim:

1. Temperature responsive apparatus comprising first and second substantially identical thermocouples having temperature sensing and reference junctions, said temperatures sensing junctions being positioned to be responsive to a temperature to be measured, means associated with said reference junctions to maintain them at uniform and different temperatures, and means electrically connected to said thermocouples and having voltage comparing means therein operable in response to the ratio of the output voltages of said first and second thermocouples.

2. Temperature sensing apparatus comprising, first and second thermoelectric means having identical thermoelectric characteristics and each having temperature reference means and temperature sensing means, the temperature sensing means of said first and second thermoelectric means being exposed to the temperature to be sensed, means for maintaining the temperature reference means of said first and second thermoelectric means at different uniform reference temperatures, impedance means having a pair of terminals and a tap, means connecting said first thermoelectric means to said terminals of said impedance means to apply a voltage of a first polarity to one of said terminals and a voltage of the opposite polarity to the other of said terminals, voltage responsive control means having an input circuit and including means for adjusting said tap in accordance with the voltage applied to said input circuit, means connecting the tap of said impedance means to the input circuit of said control means, means connecting said second thermoelectric means to said one terminal of said impedance means in a manner to apply a voltage of said first polarity to said one terminal, and means connecting said second thermoelectric means to the input circuit of said control means, the position of said tap varying as the temperature to be sensed varies.

3. Temperature responsive apparatus comprising, first and second thermocouple means having identical thermoelectric characteristics and having temperature sensing junctions exposed to a common temperature and temperature reference junctions, means for maintaining said reference junction at different uniform temperatures, impedance means having two terminals and an adjustable tap, means connecting the output of said first thermocouple means to said terminals of said impedance means to thereby apply the output voltage of said first thermocouple means to said impedance means, voltage responsive means, means connecting said voltage responsive means to said adjustable tap and to said second thermocouple means to apply a voltage to said voltage responsive means which is the entire output voltage of said second thermocouple means in opposition to a portion of the output voltage of said first thermocouple means as determined by the position of said tap, and means to position said tap to reduce the voltage applied to said voltage responsive means substantially to zero.

4. Condition responsive apparatus comprising, first and second thermocouple means having identical thermoelectric characteristics and having condition sensing junctions exposed to a common condition and condition reference junctions, means for maintaining said reference junctions at different uniform conditions, impedance means having two terminals and an adjustable tap, means connecting the output of said first thermocouple means to said terminals of said impedance means to thereby apply the output voltage of said first thermocouple means to said impedance means, voltage responsive means, means connecting said voltage responsive means to said adjustable tap and to said second thermocouple means to apply a voltage to said voltage responsive means which is the entire output voltage of said second thermocouple means in opposition to a portion of the output voltage of said first thermocouple means as determined by the position of said tap, and means to position said tap to reduce the voltage applied to said voltage responsive means substantially to zero.

5. Temperature responsive apparatus for use with a heated area comprising: a first and a second thermocouple having identical thermoelectric characteristics and sensing and reference junctions, said sensing junctions being exposed to the temperature of the heated area, means to maintain the reference junctions of said thermocouples at different uniform temperatures, a potentiometer having an impedance element with a terminal connected at each end thereof and a tap intermediate said terminals, means connecting said first thermocouple to the terminals of said potentiometer to apply the output voltage of said first thermocouple across the impedance element of said potentiometer, voltage responsive means, circuit means connecting said voltage responsive means and said second thermocouple in a series circuit to said potentiometer tap and one of the terminals of said potentiometer in a manner to cause the total output voltage of said second thermocouple to oppose that portion of the output voltage of said first thermocouple which exists between the tap of said potentiometer and said one terminal of the potentiometer, a signal voltage thereby being applied to said voltage responsive means when the total output voltage of said second thermocouple and said portion of the output voltage of said first thermocouple are not equal, and means controlled by said voltage responsive means when a signal voltage is applied thereto to cause said signal voltage to be reduced to zero.

6. Temperature measuring apparatus comprising, a first and a second thermocouple having identical thermoelectric characteristics and having their sensing junctions positioned to be responsive to the temperature in question, means controlling the temperatures of the reference junctions of said first and second thermocouples and maintaining said reference junctions at constant but different temperatures above the maximum temperature to be measured, potentiometer means having a pair of terminals and an adjustable tap, means connecting the negative lead of said first thermocouple to a first terminal of said potentiometer, means connecting the positive lead of said first thermocouple to the second terminal of said potentiometer, control means having input terminals and adapted to control the position of the adjustable tap of said potentiometer in accordance with the signal received at said input terminals, means connecting the positive lead of said second thermocouple to said second terminal of said potentiometer, means connecting the negative lead of said second thermocouple to one of said input terminals of said control means, and means connecting the adjustable tap of said potentiometer to the other input terminal of said control means whereby the balanced position of said potentiometer tap relative to said terminals is indicative of the ratio of the outputs of said thermocouples and of the temperature to be measured.

7. Temperature responsive apparatus for use with a heated area comprising, first and second thermoelectric means having identical thermoelectric characteristics, each of said thermoelectric means having a first portion located so as to be responsive to the temperature of the heated area and having a second portion, temperature controlled means for maintaining said second portion of said first and second thermoelectric means at constant but different temperatures below a predetermined minimum temperature, each of said thermoelectric means therefore producing a signal voltage indicative of the difference in temperature between the first and second portion of each thermoelectric means; a potentiometer having a pair of terminals and an adjustable tap, means connecting said first thermoelectric means to the terminals of said potentiometer to apply a voltage of a first polarity to one of said terminals and a voltage of a second polarity to the second of said terminals; means connecting said second thermoelectric means to said one of said terminals to apply a voltage of said first polarity to said one terminal; control means having input circuit means and adapted to cause adjustment of the tap of said potentiometer to balance said voltages in accordance with the input signal voltage at said input circuit means, means connecting said second thermoelectric means to said input circuit, and means connecting the tap of said potentiometer to said input circuit whereby the balanced position of said potentiometer tap relative to said terminals is indicative of the ratio of the outputs of said thermoelectric means.

References Cited in the file of this patent

UNITED STATES PATENTS

| Number | Name | Date |
|---|---|---|
| 1,206,304 | Chubb | Nov. 28, 1916 |
| 1,753,486 | Travis | Apr. 8, 1930 |
| 2,312,022 | Brooks | Feb. 23, 1943 |
| 2,595,814 | Rich et al. | May 6, 1952 |